OLE K. NILSSEN
INVENTOR.

OLE K. NILSSEN
INVENTOR.

BY John R. Faulkner
Glenn A. Arendsen

ATTORNEYS

United States Patent Office 3,434,009
Patented Mar. 18, 1969

3,434,009
ELECTRONIC IGNITION SYSTEM USING OSCILLATOR CONTROLLED CAPACITOR DISCHARGE
Ole K. Nilssen, Livonia, Mich., assignor to Ford Motor Company, Dearborn, Mich., a corporation of Delaware
Filed Nov. 9, 1966, Ser. No. 593,040
U.S. Cl. 315—209    12 Claims
Int. Cl. H05b 41/30, 39/09

This invention provides an electronic ignition system for an internal combustion engine in which an oscillator is turned on and off in timed relationship to the rotating parts of the engine. The oscillator charges a capacitor when oscillating and signals a thyristor (a gate controlled rectifier) to discharge the capacitor through an ignition coil primary winding when the oscillator switches to quiescence.

Most present day ignition systems for internal combustion engines use breaker points to control directly the electrical current through the ignition coil primary winding. The sudden change in current occurring when the breaker points open induces voltage in the coil secondary winding that is distributed to the appropriate spark plug. In some of the electronic systems in use the breaker points control electronic switching devices that in turn control current through the coil primary. More refined electronic systems charge a capacitor that subsequently is discharged through the coil primary, but these systems have required separate means for charging the capacitor and for timing the discharge in relation to the rotating parts of the engine.

The ignition system of this invention uses an oscillator to charge a capacitor and uses a pulse produced when oscillation stops to discharge the capacitor through the coil primary. In an ignition system having a source of electrical energy and a coil with a primary and secondary winding, the oscillator is connected across the source of electrical energy and a timing device operated by the engine is adapted to start and stop oscillation. A winding associated with the oscillator charges a capacitor during oscillation. When the timing device turns the oscillator to a quiescent stage, appropriate circuitry responsive to the current through the oscillator applies a pulse to the gate of a thyristor that permits the capacitor to discharge through the coil primary winding. Such a system requires a smaller number of components than known prior art ignition systems. Moreover, the use of readily available components produces an ignition system having a service free life equivalent to the life of the basic engine components.

The oscillator preferably is of the blocking type and a diamagnetic material is moved into the feedback circuit to turn the oscillator to quiescence because the current through the oscillator then drops rapidly from a high value during oscillation to a low value during quiescence. Locating an inductor in the output circuit increases the abruptness with which the oscillator turns off. This change in current is used efficiently in this invention to control the thyristor.

Other advantages and details of construction and operation are presented below in connection with the drawings in which.

Figure 1:
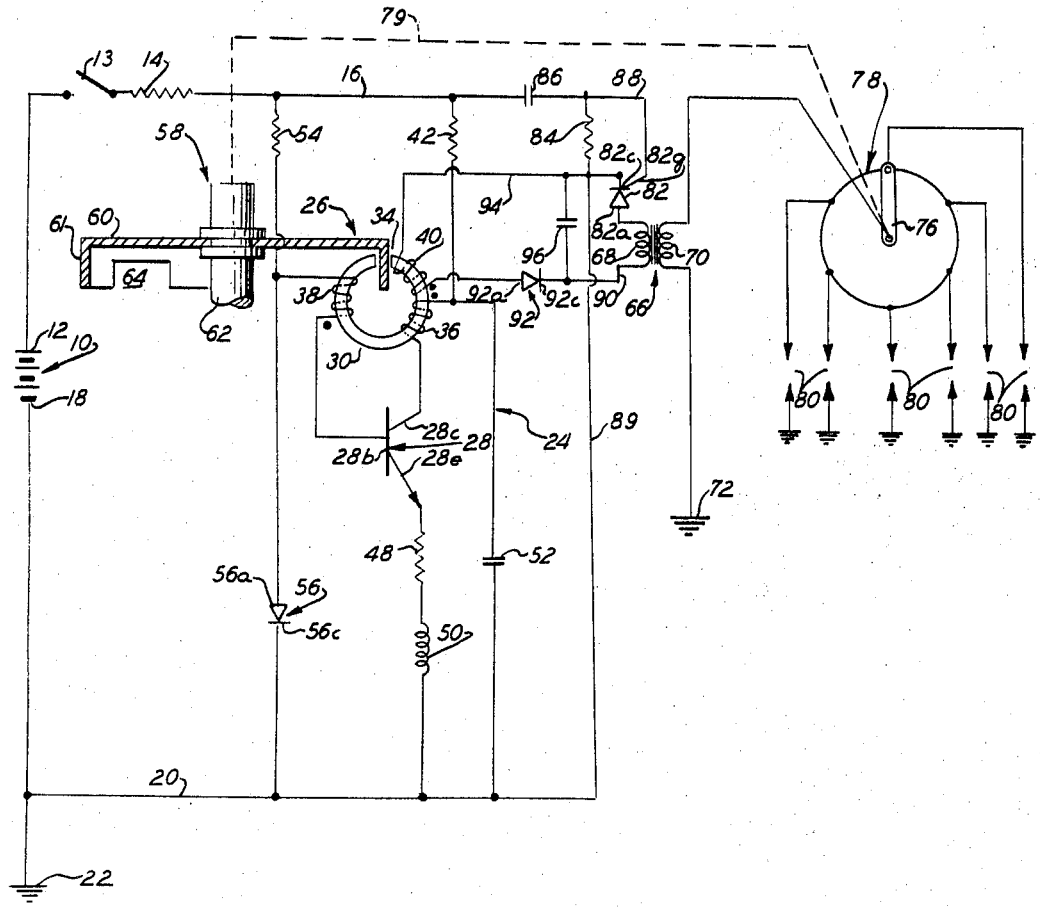
FIGURE 1 is a schematic diagram of an ignition system of this invention that includes a sketch of a rotating cup-shaped vane used in the timing device.

A battery, serving as the source of energy, is represented generally by the numeral 10 in FIGURE 1. Battery 10 has a positive terminal 12 connected through an ignition switch 13 and a resistor 14 to a positive buss lead 16. The negative terminal 18 of battery 10 is connected to negative buss lead 20 and to ground at 22. Battery 10 typically produces a no load potential of about 12 volts.

An electronic oscillator indicated generally by the numeral 24 comprises a feedback transformer 26 and a transistor 28. Transformer 26 has a substantially circular core 30 that has a gap 34 therein. A primary winding 36, secondary winding 38 and a tertiary winding 40 are wound on core 30.

A resistor 42 connects lead 16 with the dotted terminal of primary winding 36. The undotted terminal of winding 36 is connected to the collector 28c of transistor 28. Emitter 28e of transistor 28 connects with a resistor 48 that in turn is connected through an inductor 50 to lead 20. A capacitor 52 is connected between resistor 42 and lead 20 in parallel with winding 36, collector 28c, emitter 28e, resistor 48, and inductor 50.

Secondary winding 38 has its dotted terminal connected to the base 28b of transistor 28. The undotted terminal of winding 38 is connected through a resistor 54 to lead 16 and to the anode 56a of a diode 56 that has its cathode 56c connected to lead 20. Diode 56 preferably has a relatively high capacitance so it constitutes a low AC impedance from secondary winding 38 to lead 20.

Timing device 58 comprises a cup-shaped vane 60 mounted on a shaft 62. Shaft 62 is driven by conventional means from the engine camshaft (not shown). The web 61 of vane 60 contains a plurality of cutouts 64, only one of which is shown in FIGURE 1, and is made of a diamagnetic such as brass. Web 61 is adapted to move through gap 34.

An ignition coil 66 having a primary winding 68 and a secondary winding 70 has one side of secondary winding 70 connected to ground at 72. The other side of secondary winding 70 is connected through lead 74 to the rotating arm 76 of a distributor assembly 78. Arm 76 sequentially connects one of a plurality of spark plugs 80 to lead 74. Dotted line 79 represents a mechanical connection between shaft 62 and arm 76.

One side of coil primary winding 68 is connected to the anode 82a of a silicon controlled rectifier 82, the thyristor. A lead 88 connects gate 82g of controlled rectifier 82 through capacitor 86 to lead 16. A resistor 84 connects lead 88 with a lead 89 connected with lead 20. The cathode 82c of controlled rectifier 82 is connected to lead 89.

A lead 90 connects the other side of coil primary winding 68 to the cathode 92c of a diode 92. Anode 92a of diode 92 is connected to the dotted terminal of tertiary winding 40. A lead 94 connects the undotted terminal of winding 40 with lead 89. A capacitor 96 is connected between leads 90 and 94 where it is in parallel with coil primary winding 68 and controlled rectifier 82.

Figure 2:
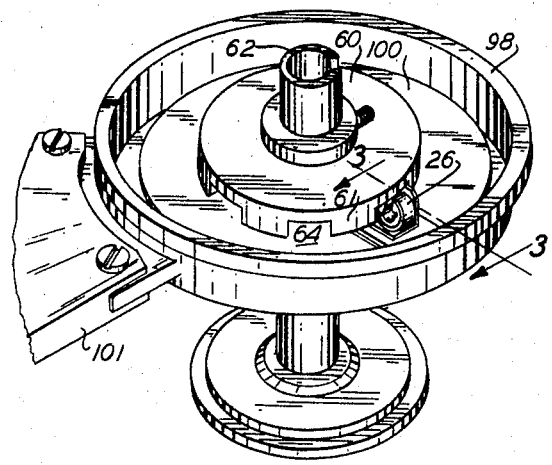
FIGURE 2 is a perspective view showing the mechanical structure of the rotating vane assembly and a feedback transformer having a gap therein that together form the timing device for starting and stopping oscillation.
Figure 3:
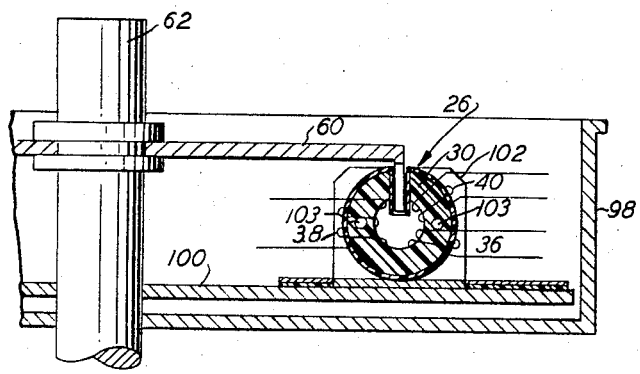
FIGURE 3 is a cross-sectional view along line 3—3 of FIGURE 2 showing additional structural details of the rotating vane and the transformer.

As shown in FIGURES 2 and 3, vane 60 rotates in a bowl-shaped housing 98. Transformer 26 is mounted on a plate 100 located near the floor of housing 98 in a position where web 61 passes through gap 34. The top of shaft 62 has a space for arm 76 of distributor assembly 78. A conventional spark advance means 101 can be associated with plate 100 if desired. The core is made of ferrite and is mounted in a conducting shield 102 by fasteners 103. Plate 100 can have a printed circuit board mounted thereon and the other circuit components can be mounted on the circuit board within housing 98.

*Operation*

Windings 36, 38 and 40 are arranged on portions 30 and 32 so current into a dotted terminal of a winding induces current going out of a dotted terminal of the other windings.

Transistor 28 is of the NPN type, a typical useful transistor being No. 2N3053. When ignition switch 13 is turned on, positive voltage is applied to base 28b and collector 28c, thereby making base 28b and collector 28c positive with respect to emitter 28e. Resistor 42 typically is about 100 ohms and resistor 54 typically is about 2200 ohms. Diode 56, typically No. 1N4001, and resistor 42 bias transistor 28 slightly into conduction. The bias, however, is insufficient to sustain oscillation while the material of web 61 is in gap 34. Such a slight forward bias is desirable because it ensures sufficient transistor gain to sustain oscillation when an induced voltage increment is produced in secondary winding 38.

When a cutout 64 moves into gap 34, feedback occurs from winding 36 to winding 38 to induce additional positive voltage at base 28b. Typically, gap 34 is about 0.055 inch., winding 36 is 10 turns of 30 AWG wire and winding 38 is 12 turns of 30 AWG wire. The additional voltage increases the forward bias on base 28b sufficiently so transistor 28 increases conduction. Conduction in turn increases the current through winding 36, which then increases the induced voltage at base 28b to increase further the conduction of transistor 28. Transistor 28 continues to increase its conduction until it saturates.

At saturation, the increase in current through winding 36 stops and the induced increment of voltage at base 28b disappears. Base 28b then becomes negative with respect to emitter 28e and current through transistor 28 falls rapidly to a low value.

The falling current through winding 36 induces a negative voltage at base 28b that keeps transistor 28 off until the negative voltage is dissipated. At this point, conduction of transistor 28 begins again and the above cycle is repeated in an oscillatory manner as long as a cutout 64 is in gap 34. Oscillation frequency is determined primarily by the inductance of winding 36 and is at least several kilocycles per second, preferably ranging as high as several megacycles per second. During oscillation when current through transistor 28 falls, current through resistor 42 flows into capacitor 52, which is selected so that the current through resistor 42 is substantially constant. A typical value for capacitor 52 is 2 microfarads at 20 volts.

Increasing current through winding 36 during oscillation induces conventional current in winding 40 passing out of the dotted terminal. Induced current from winding 40 is applied through diode 92 to capacitor 96. When current through winding 36 is decreasing, diode 92 blocks the negative voltage induced at the dotted terminal of winding 40 from capacitor 96. Thus a positive charge builds up on the cathode 92c side of capacitor 96.

As the diamagnetic material of web 61 moves into gap 34, the gain of transformer 26 declines until the voltage induced in winding 38 falls below the level necessary to sustain oscillation. The presence of web 61 in gap 34 also decreases the self-inductance of winding 36, which increases the oscillation frequency of oscillator 24. This increased frequency in turn increases the inductance of inductor 50, which typically is about 0.5 microhenry, thereby increasing the impedance provided by inductor 50. Preferably, transistor 28 is selected so its gain decreases significantly with the increase in frequency resulting from the changed self-inductance of winding 36.

The decreasing gain of transformer 26 and transistor 28 plus the increased impedance offered by inductor 50 operate in cascade to stop oscillation precipitously. Current through resistor 42 drops suddenly, raising the voltage in lead 16. Capacitor 86 (0.5 microfarad) and resistor 84 (1000 ohms) differentiate the rise in voltage in lead 16 to produce a positive pulse at gate 82g. This pulse turns on rectifier 82. The charge built up on capacitor 96 then discharges through primary winding 68 and controlled rectifier 82 and thereby induces a spark ignition voltage in secondary winding 70.

As capacitor 96 discharges through primary winding 68 and controlled rectifier 82 a positive charge builds up on the plate of capacitor 96 connected to lead 94. This charge passes back through controlled rectifier 82, sweeping out the carriers therein and turning off the controlled rectifier. The next cutout portion 64 then moves into gap 34, oscillation begins, and the cycle is repeated.

If desired, a capacitor can be connected in parallel with diode 56 to decrease further the AC impedance between secondary winding 38 and ground. Vane 60 can have a planar or some other shape and can be made of paramagnetic or ferromagnetic material. Oscillator 24 can be designed so no oscillation takes place when cutout 64 is in gap 34 and movement of web 61 into gap 34 begins oscillation. Transformer 26 can be split into two C-shaped portions facing each other across dual gaps to increase the change in feedback when web 61 moves between the portions.

By using the change in current between oscillation and quiescence to control a thyristor, the oscillator of this invention performs the dual function of charging a capacitor and then triggering the discharge of the capacitor when appropriate for engine operation. Fewer components, therefore, are necessary to make up the ignition system of this invention. The vaned timing means requires little or no servicing and replaces the breaker points that require adjustment and replacement periodically. Rugged silicon controlled rectifiers are used where possible, thereby greatly increasing the service life of the ignition system. Circuitry details, particularly the combination of transformer 26, transistor 28 and inductor 50, stop oscillation precipitously when the vane moves into the gap in the transformer to minimize timing errors and variations.

What is claimed is:

1. In an ignition system for an internal combustion engine having a source of electrical energy and a coil with a primary winding and a secondary winding, means for inducing an ignition voltage in the coil secondary winding comprising
   an oscillator connected across said source of electrical energy,
   timing means operated by the engine to start and stop oscillation of said oscillator,
   a thyristor in series with the coil primary winding,
   a capacitor in parallel with said thyristor and said coil primary winding,
   winding means for charging the capacitor when the oscillator is oscillating, and
   circuit means responsive to the current through the oscillator for turning said thyristor to a conducting state to discharge the capacitor through the coil primary winding when the oscillator switches to quiescence.

2. The ignition system of claim 1 in which the oscillator is a blocking oscillator that comprises a transistor and a transformer providing a feedback connection between an output circuit and an input circuit of said transistor.

3. The ignition system of claim 2 in which the transformer core has a gap therein and the timing means comprises a rotating vane having cutout portions along its edge, said edge moving through said gap.

4. The ignition system of claim 3 in which said winding means is associated with said transformer.

5. The ignition system of claim 4 in which the transformer comprises
   a transformer primary winding connected to the collector of the transistor and
   a transformer secondary winding connected to the base of said transistor.

6. The ignition system of claim 5 in which said winding means for charging the capacitor is wound on said transformer.

7. The ignition system of claim 6 in which the emitter of said transistor is connected to an inductive means.

8. The ignition system of claim 7 comprising a capacitor connected in parallel with the transformer primary winding, the emitter and collector of the transistor, and said inductive means.

9. The ignition system of claim 2 in which the transformer comprises a primary winding connected to the collector of the transistor.

10. The ignition system of claim 2 in which the emitter of the transistor is connected to an inductive means.

11. In an ignition system for an internal combustion engine having a source of electrical energy, means for producing and timing an ignition voltage comprising an oscillator connected across said source of electrical energy,
timing means operated by the engine to start and stop oscillation of said oscillator,
a capacitor charged by said oscillator during oscillation,
a thyristor, and
circuit means for turning said thyristor to a conducting state when said timing means stops oscillation of said oscillator, said thryristor discharging said capacitor to produce an ignition voltage.

12. The ignition system of claim 11 in which the oscillator is a blocking oscillator and the circuit means uses the change in current flow through said oscillator between oscillation and quiescence to turn the thyristor to a conducting state.

References Cited

UNITED STATES PATENTS 3,280,810  10/1966  Worrell et al. _____ 315—209 X
3,324,841  6/1967  Kebbon et al. _____ 315—209 X JOHN W. HUCKERT, *Primary Examiner.*

R. F. POLISSACK, *Assistant Examiner.*

U.S. Cl. X.R.

315—218; 331—112